Sept. 20, 1938.    E. W. BUTZLER    2,130,417
APPARATUS FOR FEEDING WATER CONDITIONING CHEMICALS DIRECT TO BOILERS
Filed March 27, 1936
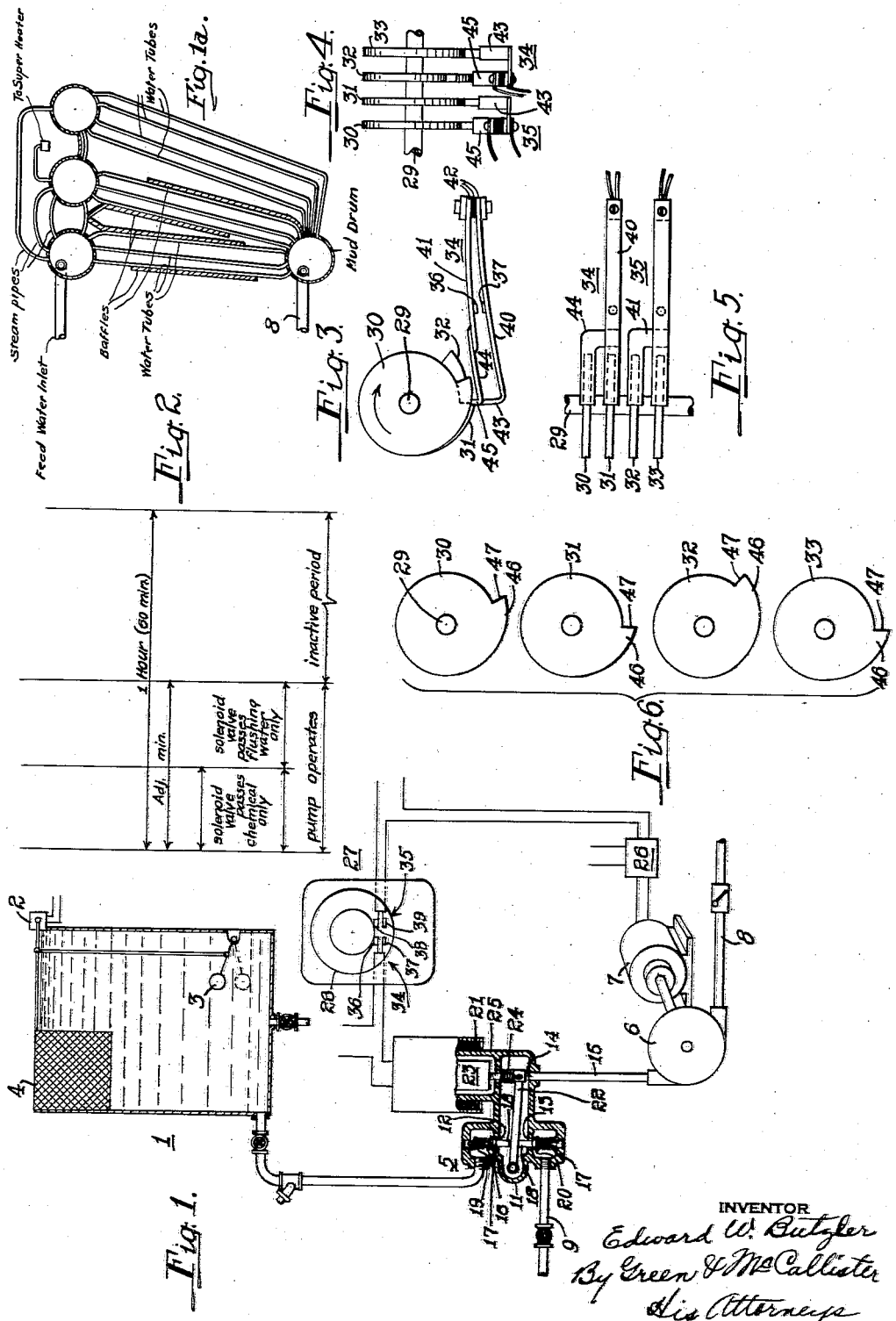

Patented Sept. 20, 1938

2,130,417

UNITED STATES PATENT OFFICE 2,130,417

APPARATUS FOR FEEDING WATER CONDITIONING CHEMICALS DIRECT TO BOILERS

Edward W. Butzler, Avalon, Pa., assignor to John M. Hopwood, Mount Lebanon, Pa.

Application March 27, 1936, Serial No. 71,290

6 Claims. (Cl. 210—22)

This invention relates to the treatment of water used in steam boilers, involving the addition of a chemical thereto, and more particularly to apparatus for controlling the delivery of such chemical to boilers and the flushing of the pipe lines and other apparatus through which the chemical flows, to prevent the formation of deposits therein and particularly in the openings of such lines in the boilers, and also to prevent corrosion of the lines which might occur if the chemical employed is of an acid nature and allowed to stand therein, or if the chemical is one whose pH value might change on standing and corrode the pipe lines and apparatus associated therewith.

An object of this invention is to provide a system which will deliver water-conditioning chemical into the feed water for a boiler, at a predetermined rate for a predetermined interval, and then, after each period of feed, flush out the pipe line and apparatus traversed by the chemical.

Another object of the invention is to provide a system as set forth that will perform its chemical feeding and flushing operations automatically in accordance with a predetermined schedule or cycle.

A further object of the invention is to utilize a pump for delivering water-conditioning chemical into the feed water line of a boiler in combination with a timing mechanism which will cause the chemical to be delivered for a definite portion of a time interval or cycle, for example for a predetermined number of minutes of an hour interval, at the end of which interval portion, the chemical is shut off from the pump, but the pump caused to operate to deliver water for an extended period less than the time cycle until the pump and feed water line traversed by the chemical has been flushed out, at which time the driving motor for the pump is stopped until the time cycle has elapsed, and then to repeat the chemical delivery and flushing operations during each successive cycle.

Other objects of the invention will, in part, be apparent and will, in part, be obvious from the following description taken in conjunction with the accompanying drawing, in which:—

Figure 1 is a more or less diagrammatic view of apparatus for supplying water-conditioning chemical to a boiler and embodying one form of this invention;

Fig. 1a is a diagrammatic view of a boiler showing where the water conditioning chemical enters the boiler;

Fig. 2 is a diagram depicting the mode of operation of the apparatus shown in Fig. 1;

Fig. 3 is a view in front elevation of a cam operated switch unit embodied in and forming part of a timing mechanism utilized in the apparatus shown in Fig. 1;

Figs. 4 and 5 are end and bottom views, respectively, of the unit shown in Fig. 3; and Fig. 6 is an exploded view showing a series of cams embodied in the units of Figs. 3, 4, and 5, illustrating the relative positions of these cams one to another.

Throughout the drawing and the specification, like reference characters indicate like parts.

In the treatment of feed water for boilers, the chemical employed for a particular purpose, such as the chemical used to prevent the formation of scale or other objectionable deposits should be delivered in accordance with the amount of feed water delivered to the boiler per unit of time, as well as in accordance with the chemical character of the water. The chemical character of the water having been determined by analysis, and the amount of water to be treated being known, the amount of conditioning chemical to be added can be calculated.

Theoretically, the chemical should be added to the feed water continuously at the same time rate as the water is being delivered to the boiler, but other considerations make this impractical as where chemicals of an acid nature, or chemicals whose pH values are likely to change on standing in a pipe line, are employed. If the chemicals are of an acid nature, or if their pH values change on standing, the pipe lines through which the chemical flows should be flushed out with water often enough to prevent corrosion and the formation of encrustations in openings of the chemical feed line in the boiler.

In accordance with this invention it is proposed to feed the chemical intermittently, with the feeding periods long enough to allow the required amount thereof to be delivered to the boiler water and then to flush out the pipe lines and apparatus through which the chemical flows, with water, the flushing periods to be long enough to either completely flush out the chemical or to so dilute it that corrosion of any consequence will not occur.

In practicing this invention a supply of chemical, for example, sodium metaphosphate in liquid form, is provided and this is pumped directly into the boiler drum, or into the feed water line at a point adjacent its entry to the boiler drum, at such a rate and for such a period that the proper amount is supplied. The chemical feed is then cut off and flush water is pumped through the pipe lines and the pump traversed by the chemical until the chemical has been flushed out as above stated. For a given boiler water condition, the chemical feed and flushing periods are adjusted in length of time and repeated in successive time cycles, to accomplish the purposes intended. The relative lengths of the alternate chemical feeding and flushing periods, for one cycle of operation, are depicted by Fig. 2 and the legends applied thereto.

For convenience the chemical feed and flushing periods can be worked out on the basis of hour intervals, i. e. the chemical feed period is for a portion of the hour and the flushing period is for another portion of the hour, either for a fractional part of the hour remaining after the chemical feed period, or for a maximum part of the balance of the hour if necessary. If the balance of the hour is not required for flushing, the pumping operation is stopped until the beginning of the following hour or cycle at which time the feed of chemical is repeated followed by a period of flushing and so on.

As will be apparent from the following, means are provided for accomplishing automatically, the operations of intermittent feed of chemical for a definite period and of flushing with water to prevent the chemical from corroding the pump and pipe lines through which the chemical flows. In the drawing, Figs. 1 and 3 to 6, inclusive, illustrate apparatus employed in an embodiment of the invention whereby the alternate periods of chemical feed and flushing may be accomplished and controlled, and Fig. 2 is a chart or graph showing the relation of the chemical feed and flushing periods to each other and the relative lengths of time each period takes up in a given period of time or cycle of operation.

Referring more particularly to Fig. 1 illustrating a general organization of the invention, I have there shown a tank 1 in which the chemical solution, such as sodium metaphosphate, is stored, and provided with an alarm 2 actuated by a low level responsive device 3. This tank, for convenience, has a capacity sufficient to hold the supply of chemical required for a run of twenty-four hours or longer or for any desired length of time. The tank includes a basket or holder 4 of wire mesh into which chemical in comminuted or crystal form is deposited. The tank is filled with water to a level which floods the chemical and causes it to dissolve. The amount of chemical dissolved is dependent upon the concentration required by the chemical nature of the water to be treated.

The chemical solution thus formed flows from the tank through a multi-way valve assembly 5 to the intake side of the pump 6 which is driven by a motor 7, preferably an electric motor. The pump delivers the chemical into line 8 which may be connected directly to the boiler for example to the mud drum as shown in Fig. 1a, or to the feed water line at a point adjacent its entry to the boiler drum. Fig. 1a is a schematic illustration of a boiler, and the notations thereon indicate what the various parts shown, are.

Valve 5 is of such construction that when in one position, chemical is delivered to the intake of the pump, and when in another position the feed of chemical is shut off and the intake of the pump is connected to a pipe 9 which in turn is connected to a supply of flush water.

When the chemical feed period is over, valve 5 is operated to shut off the chemical to connect pump 6 to the supply of flush water, the electric motor, in the meantime, continuing to drive the pump until the flush period is over. When the flush period is finished, pump 6 is stopped until the beginning of the next cycle arrives, at which time the pump is started simultaneously with shifting of valve 5 to the position in which the flush water supply is cut off from and the chemical supply connected to the pump.

Multi-way valve 5 is preferably electrically operated, either by motor or solenoid, the one illustrated being solenoid operated. Valve 5 comprises a body 11 having a plurality of inlet ports 12 and 13 and an outlet port 14 connected by a pipe 15 to the intake of the pump. Inlet port 12 is connected to the supply of chemical and port 13 is connected to the flush water supply line 9.

Inlet port 12 is controlled by a valve 16 having stems 17 and 18 extending from opposite faces thereof, and which is urged towards closed position by a spring 19. Valve port 13 is controlled by a valve 20 similar to valve 16 as indicated by the application of the same reference characters thereto.

Valves 16 and 20 are actuated by means of a solenoid 21 and lever 22. Lever 22 is pivoted at one end within the valve body, extends between stems 18 of valves 16 and 20 and is connected at its other end to a core or plunger 23 of the solenoid. A spring 24 urges the lever downwardly so that when the solenoid is deenergized, valve 16 is closed and valve 20 opened. Core 23 is housed within casing 25 which is closed at its top, and located within the solenoid 21. The casing being closed, liquid cannot escape to attack the solenoid.

Motor 7 is controlled, i. e. started and stopped, by means of an electrically operated contactor illustrated diagrammatically at 26. The operation of the contactor and the energization of the solenoid are both controlled by means of a timing unit 27. This unit may comprise a clock-operated circuit controller, preferably a synchronous clock driven controller.

The timing unit illustrated includes an electric motor 28 that drives a shaft 29 on which a plurality of cams 30, 31, 32, and 33 are mounted, and a pair of switches 34 and 35 arranged to be operated by the cams.

Switch 34 includes contact members 36 and 37 that control the circuit for solenoid 21 and switch 35 includes contact members 38 and 39 that control the opening and closing of the motor contactor or starter 26. The cams above mentioned and the switches are so arranged that the contact members of both switches 34 and 35 are closed simultaneously at the beginning of each cycle whereby the motor is energized to drive the pump and the solenoid energized to close valve port 13 and open valve port 12 to connect the pump to the supply of chemical. These switches remain closed until the pump has delivered the amount of chemical required, at which time, the cams associated with switch 34 open contact members 36 and 37 thereby deenergizing the solenoid, shutting off the supply of chemical and connecting the pump to the flush water supply, meanwhile the pump continues to operate until sufficient flush water has been delivered to wash the chemical out of the pump and the pipe lines leading to the boilers. When the flushing has been completed, the motor and pump are stopped because cams 32 and 33 open contact members 38 and 39.

Switch 34 comprises leaf spring-like members 40 and 41 to which contact members 36 and 37 are attached and which are secured at one end to an insulating support 42 and disposed with their free ends in engagement with cams 31 and 33, respectively. The free end of spring member 40 has a right angle flange 43 that rides on cam 31 while spring member 41 has an offset 44 that terminates in a right angle flange 45 that rides on cam 30. As may be seen in Fig. 3, flange 43 is longer than flange 45 for a purpose that will later be made apparent.

Switch 35 is similar to switch 34, hence corresponding parts are designated by the same reference characters.

In Fig. 6 the form and relative positions of the cams are shown. Each cam is similar in shape, and each cam has a high or raised portion 46 terminating in a shoulder 47. Cams 31 and 33 occupy the same relative positions to each other, that is, shoulders 47 lie in the same plane relative to each other while the shoulders 47 of cams 30 and 32 are displaced in a counterclockwise direction with respect to each other and to the shoulders of cams 31 and 33.

Because of this arrangement of the cams, it will be seen that switches 34 and 35 will both be in circuit breaking position when the flanged ends of the spring members thereof are riding on the high portions of the cams. If it be assumed that these cams are driven clockwise, it will be seen that spring members 40 of switches 34 and 35 drop off shoulders 47 of cams 31 and 33 to the low portions thereof, at the same time, while spring members 41 thereof are still riding the high portions of cams 30 and 32. When spring members 40 slip off the shoulders 47 of cams 31 and 33 the contact members of both switches 34 and 35 are brought into engagement thereby completing the energizing circuit of solenoid of valve 5 and for the starter 26 of motor 7. The chemical supply is therefore connected to the intake of the pump at the same time that the pump is started.

When the cams have traveled clockwise to the point where spring 41 slips off shoulder 47 of cam 32 to the low portions thereof, contact members 36 and 37 of switch 34 are separated thereby breaking the solenoid circuit and deenergizing the same. The break in the solenoid circuit occurs because flange 45 of spring 41 being shorter than flange 43 at the free end of spring 40 and because of flange 43 already being on the low part of cam 31, spring 41 can move away from spring 40 and separate contact members 36 and 37.

When solenoid 21 is deenergized, valve 5 is shifted to cut off the supply of chemical from the pump and to connect it to the flush water supply, meanwhile the pump continues to operate because the contact members of switch 35 are still in engagement. The pump continues to run until spring member 41 drops off shoulder 47 of cam 32 at which time the motor circuit is broken and the pump stopped. The pump remains idle until the cams return to the positions shown in Fig. 6.

With the positional arrangement of the cams as shown in Fig. 6, the chemical feeding and flushing periods are equal in length of time, but each or both of these periods may be changed as desired by merely turning cams 30 and 32 relative to cams 31 and 33. Turning cam 30 clockwise decreases the chemical feed period while turning it counterclockwise increases it. A similar shifting of cam 32 decreases or increases the length of the flush period. But where fixed water conditions are met with in practice, these cams may be set in one position to give the required length of chemical feed and flushing periods.

Having thus described the invention, what is desired to be secured by Letters Patent is:

1. In apparatus for feeding water conditioning chemical to the water in boilers, the combination with a boiler; a pump connected to the boiler and having a motor for driving the same, a supply of water conditioning chemical, a supply of flush water, a valve assembly adapted to connect the pump alternately to the chemical and flush water supplies, of means for starting the pump driving motor and connecting the chemical supply to the pump, means for operating said valve assembly to cut off the supply of chemical after a predetermined period of time and to connect the supply of flush water to the pump, and means for stopping the pump motor after flush water has been delivered to the boiler water for a predetermined period of time.

2. In apparatus for feeding water conditioning chemical to the feed water entering a boiler, the combination with a boiler; a pump connected to the boiler and having a motor for driving the same, a supply of water conditioning chemical, a supply of flush water, a valve assembly adapted to connect the intake of the pump alternately to the chemical and flush water supplies, of means for starting the pump driving motor and operating said valve assembly to connect the chemical supply to the pump, means for operating said valve assembly to cut off the supply of chemical after a predetermined period of time and to connect the supply of flush water to the pump, and means for stopping the pump motor after flush water has been delivered to the feed water line for a predetermined period of time.

3. In apparatus for feeding water conditioning chemical to the water in boilers, the combination with a boiler; a pump connected to the boiler and having a motor for driving the same, a supply of water conditioning chemical, a supply of flush water, a valve assembly arranged to connect the pump alternately to the chemical and flush water supplies, of means for simultaneously starting the motor driving pump and operating the valve assembly to connect the chemical supply to the pump, means for operating said valve assembly to cut off the supply of chemical after a predetermined period of time and then to connect the supply of flush water to the pump, and means for stopping the pump motor after flush water has been delivered to the boiler for a predetermined period of time.

4. In apparatus for feeding water conditioning chemical to the water in boilers, the combination with a boiler; a pump connected to the boiler and having a motor for driving the same, a supply of water conditioning chemical, a supply of flush water, a valve assembly arranged to connect the intake of the pump alternately to the chemical and flush water supplies, of means for simultaneously starting the pump driving motor and operating the valve assembly to connect the chemical supply to the pump intake, means for operating the valve to cut off the supply of chemical after a predetermined period and to connect the supply of flush water to the pump, and means for stopping the pump motor after flush water has been delivered to the boiler for a predetermined period of time.

5. In apparatus for feeding water conditioning chemical to the water in boilers, the combination with a boiler; a pump connected to the boiler and having a motor for driving the same, a supply of water conditioning chemical, a supply of flush water, a valve assembly arranged to connect the pump alternately to the chemical and flush water supplies, of means cyclically repeating the feed of chemical and the flushing of the pump and its connection to the boiler, comprising means for starting the pump and operating the valve assembly to chemical feed position to effect the delivery of chemical to the boiler for a predetermined portion of the total time of a cycle, means for operating the valve assembly to shut off the supply of chemical and to connect the pump to the flush water supply, and means for stopping the pump before the total time of the period of a cycle expires, said pump being started and connected to the supply of chemical at the beginning of the next cycle.

6. In apparatus for feeding water conditioning chemical to the water in boilers, the combination with a boiler; a pump connected to the boiler and having an electric motor for driving the same, a supply of water conditioning chemical, a valve assembly arranged to alternately connect the intake of the pump to the supply of chemical and to a supply of flush water, electrically actuated means for operating the valve assembly to chemical feed and flush water delivery positions, of means for causing the alternate delivery of chemical and flush water to the boiler for predetermined portions of repeating cyclical periods, said means comprising a timing device having switches associated therewith for controlling the electrical valve assembly actuating means and the pump motor, and means for closing the switches to energize the valve actuating means to connect the chemical supply to the pump and starting the pump motor, said switch closing means being actuated by the timer and adapted to open the switch controlling the valve actuating means to cause the valve assembly to connect the pump to the flush water after a predetermined portion of the time cycle has elapsed, and to open the motor controlling switch to stop the motor after an additional portion of the cycle has elapsed, the pump and motor remaining idle until the beginning of another cycle.

EDWARD W. BUTZLER.